United States Patent [19]

Rieppel et al.

[11] 4,437,649
[45] Mar. 20, 1984

[54] EXOTHERMIC CUTTING ELECTRODE

[75] Inventors: Perry J. Rieppel, Worthington; Paul E. Moore, Lancaster, both of Ohio

[73] Assignee: Arcair Company, Lancaster, Ohio

[21] Appl. No.: 488,917

[22] Filed: Apr. 27, 1983

Related U.S. Application Data

[63] Continuation-in-part of Ser. No. 274,118, Jun. 26, 1981, Pat. No. 4,391,209.

[51] Int. Cl.³ .............................................. B23K 35/02
[52] U.S. Cl. ...................................... 266/48; 266/225
[58] Field of Search ................................... 266/48, 225

[56] References Cited

U.S. PATENT DOCUMENTS

| | | | |
|---|---|---|---|
| 1,773,653 | 8/1930 | Turner . | |
| 2,345,758 | 4/1944 | Lincoln et al. | 219/10 |
| 2,806,128 | 9/1957 | Muller | 219/146 |
| 3,147,362 | 9/1964 | Ramsey et al. | 219/146 |
| 3,260,076 | 7/1966 | Humberg | 67/34 |
| 3,487,791 | 1/1970 | Dalm | 110/1 |
| 3,500,774 | 3/1970 | Meier | 110/1 |
| 3,507,230 | 4/1970 | Seib | 110/1 |
| 3,507,231 | 4/1970 | Meier | 110/1 |
| 3,570,419 | 3/1971 | Brundenberger | 110/1 |
| 3,591,758 | 7/1971 | Clucas | 219/70 |
| 3,602,620 | 8/1971 | Fässler | 431/99 |
| 3,738,288 | 6/1973 | Brandenberger | 110/1 |
| 4,069,407 | 1/1978 | Brower | 219/70 |
| 4,182,947 | 1/1980 | Brower | 219/70 |

*Primary Examiner*—W. Stallard
*Attorney, Agent, or Firm*—James C. Simmons; E. Eugene Innis

[57] ABSTRACT

An exothermic cutting electrode or burning bar having an oxidizable metal fluid conduit (tube) surrounded by a mass of metal similar to that of the fluid tube, the entire structure covered with an outer oxidizable metallic tube and/or an electrically insulating water impervious cover, either end of the electrode being adapted for connection to a source of oxidizing fluid and electric current, so that, an arc can be struck between a workpiece and the free end of the electrode to produce a cutting flame. By proper selection of the type and mass of the materials of construction the electrode will burn after the electric current has been turned off.

5 Claims, 8 Drawing Figures

EXOTHERMIC CUTTING ELECTRODE

This application is a continuation-in-part of U.S. Pat. application Ser. No. 274,118 filed June 26, 1981 now U.S. Pat. No. 4,391,209.

TECHNICAL FIELD

This invention pertains to exothermic cutting electrodes or burning bars of the type wherein a mass of metal is ignited in the presence of an oxidizing gas (e.g. oxygen) to form a flame or products of combustion which can be directed at a structural shape for cutting or piercing the structural shape.

BACKGROUND OF THE PRIOR ART

Conventional burning bars which are used on land for cutting structural materials such as rock, stone, concrete, iron and steel are disclosed in any of U.S. Pat. Nos. 3,260,076; 3,507,231; 3,487,791; 3,500,774; 3,507,230; 3,570.419; and 3,738,288. These burning bars share a common feature in that they have an outer tube within which is placed a plurality of elongated rods or wires to make up a mass of oxidizable metal. Oxygen is conducted down through the outer tube to the end of the rod where combustion is initiated to produce a flame which is directed at the structural material. The prefered burning bars usually contain a readily oxidizable metal (e.g. magnesium or aluminum) as one or more of the rods to promote combustion.

The use of multiple strands in various configurations for arc welding electrodes is shown in U.S. Pat. Nos. 1,773,653, 2,345,758; 2,806,128 and 3,147,362 it being well known that welding electrodes are generally unsuitable for cutting operations.

Twisted wire or cable type burning bars or thermal ances are shown in U.S. Pat. Nos. 3,591,758; and 3,602,620.

Lastly, the multiple wire burning bar has been adapted to underwater use as shown in U.S. Pat. Nos. 4,069,407 and 4,182,947. The underwater rods of the aforementioned patents have an outer tube within which are disposed a plurality of elongated steel rods or wires the wire bundle including a readily oxidizable metal rod or wire which is preferably aluminum.

BRIEF SUMMARY OF THE INVENTION

The present invention pertains to exothermic cutting electrodes or burning bars as they are known in the art. In particular the present invention provides an electrode having a central (inner) tube or oxygen passage around which is disposed a mass of similar metal. The mass of metal is held to the inner tube in a number of ways the most prevalent being the use of an outer tube. However, ferrules can be crimped to the mass of metal to hold it to the inner tube and the entire length between the ferrules can be covered with a water impervious electrically insulating coating to provide the outer surface of the electrode. The inner tube and mass of metal can be steel which is readily obtainable and easily fabricated which in the presence of oxygen conducted down the center tube will permit the establishment of a flame which can be directed against materials of construction to accomplish a cutting, boring, piercing or other severing operation. The inner or center tube insures that a jet of oxidizing gas and flame hits the workpiece with a concentrated force. According to the present invention the electrodes are constructed so that an electrical current passed down through the mass of metal can be used to heat the end of the electrode in the presence of the stream of oxygen, to its ignition temperature and thus start the progressive burning of the electrode mass producing a very high temperature flame. By proper selection of the metal and the proper relationship between the metal mass and metal surface in contact with the stream of oxygen (oxidizing gas), the current can be turned off once the flame from the burning mass of metal is established and the cutting can continue until the electrode is consumed.

Passage of the oxidizing gas can be enhanced by indenting the surface of the wire used as the mass of metal, grooving the outer surface of the inner tube and the means by which the outer tube or ferrules are fixed to the mass of metal.

Use of a particular coating can result in a visible indicator end on the electrode when it is in use underwater.

DETAILED DESCRIPTION OF THE INVENTION

An exothermic electrode or burning bar according to the present invention provides a mass of oxidizable metal that in the presence of an oxidizing gas (e.g. oxygen) and a source of ignition will produce a flame which can be directed against a workpiece which may be part of a fixed land structure or marine structure or similar object so that in the hands of the skilled operator a cutting, piercing or burning operation can take place. Electrodes according to the present invention can be used to burn, cut or pierce structural materials in air or water such as cast iron, steel, concrete and rock, the latter being either natural or synthetic.

Figure 1:
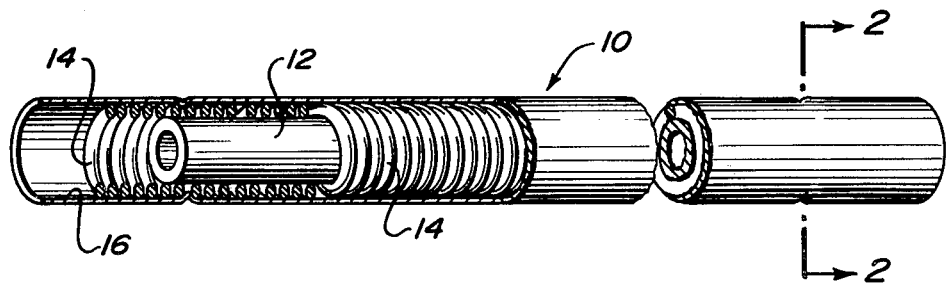
FIG. 1 is a partially fragmented perspective view illustrating an electrode for which the present invention can be used.
Figure 2:
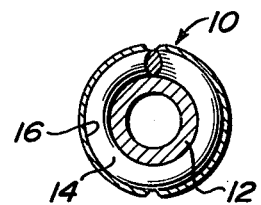
FIG. 2 is a view taken along the line 2—2 of FIG. 1.

One form of the invention is shown in FIGS. 1 and 2, the electrode shown generally as 10 comprising an inner tube 12 the inner tube being of a low carbon steel 17½ inches (~44.45 cm) long having a 0.187 inches (~4.74 mm) outside diameter and a 0.130 inches (~3.30 mm) inside diameter. Wrapped around tube 12 in a helical fashion is a continuous length of low carbon steel wire 14 having a nominal diameter of 0.62 inches (~1.57 mm). The steel wire is wound in such a fashion as to define a tube having a 0.305 inches (~7.75 mm) outside diameter and a 0.192 inches (~4.88 mm) inside diameter with an overall length of 17¾ inches (~45.09 cm). Wire 14 is wound so that it projects approximately 0.125 inches (~3.18 mm) over the ends of inner tube 12. Disposed around the wire 14 is an outer tube 16 having an outside diamter of 0.375 inches (~9.53 mm) and an inside diameter of 0.319 inches (~8.10 mm) with an overall length of 18 inches (~45.72 cm). As shown in the drawing on the torch end of the electrode, the outer tube 16, projects beyond wire 14 and wire 14 beyond inner tube 12. On the burning end the three components can be flush.

The entire electrode 10 can then be coated with 0.015–0.020 inches (~3.81 mm–~5.08 mm) of an electrically insulating material such as a vinyl sold by Michigan Chome and Chemical Company under the trade name MICRON 455 Vinyl. In use a portion of one end of the plastic coating can be stripped away so that the electrode can be clamped in a torch (not shown) such as disclosed in U.S. Pat. No. 3,780,258 for use under water. Alternatively, the electrode can be fabricated by clamping the outer tube in a fixture which will prevent adherence of the coating as it is applied.

Set forth in Table I are a series of tests performed under water wherein electrodes according to that shown in FIGS. 1 and 2 were tested against electrodes shown in U.S. Pat. No. 4,069,407.

continued. In test number 3 it is apparent that the inventive electrodes were superior since they had a significantly better overall performance for the length of electrode consumed. It is believed the inner tube insures that a jet of oxygen and flame of burning metal hits the workpiece with concentrated force thus the inventive electrodes performed better than the prior art electrodes.

Figure 3:
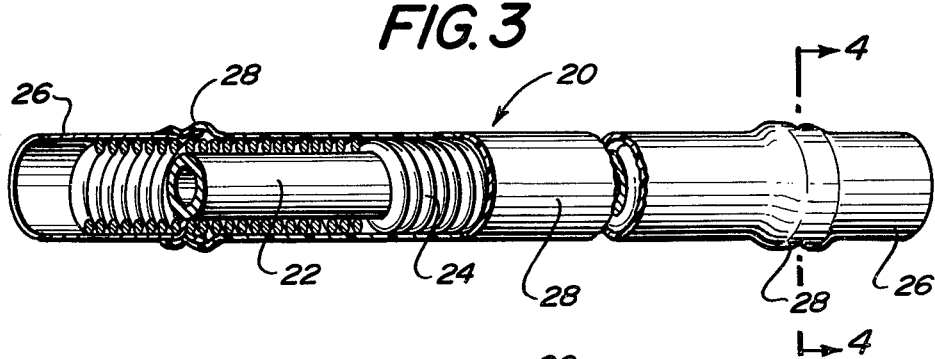
FIG. 3 is a perspective view partially fragmented of an alternate embodiment of the electrode of FIG. 1.
Figure 4:
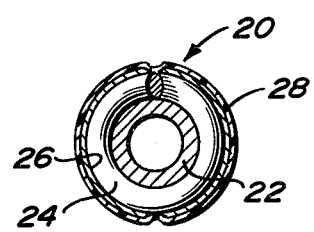
FIG. 4 is a cross-sectional view taken along the line 4—4 of FIG. 3.

FIGS. 3 and 4 disclose an alternate embodiment of the present invention wherein the electrode 20 includes a central tube 22 of low carbon steel having a 0.187 inches (~4.75 mm) outside diameter and a 0.130 inches (~3.30 mm) inside diameter. Wrapped around tube 22 is a continuous helix of 0.062 inches (~1.57 mm) diameter steel wire 24. On either end of the electrode 20 a steel ferrule 26 is crimped over the wound wire 24 the ferrule having an axial length of 1.5 inches (~3.81 cm), a 0.375 inches (~9.53 mm) outside diameter and a 0.319 inches (~8.10 mm) inside diameter. Between the ferrules covering the exposed wound wire 24 is a plastic coating 28 similar to the coating used on the electrode of FIG. 1. Electrodes according to FIGS. 3 and 4 were tested and found to perform satisfactorily. As long as the hot metal spatter was not excessive and did not adhere to and burn through the plastic coating an electrode of this type will perform satisfactorily.

TABLE #I

| TEST[1] NO. | AMP | INCHES ELECT. USED | TOTAL ARC-TIME MIN. | LENGTH OF CUT INCHES | INCHES CUT PER INCHES OF ELEC. | INCHES CUT PER MINUTE ARCTIME | THICKNESS OF MATERIAL[2] |
|---|---|---|---|---|---|---|---|
| 1P | 300 | 14.875 (37.78)[3] | .566 | 8.75 (22.23) | .588 (1.49) | 15.45 (39.24) | 1½" (3.81) |
| 1I | 300 | 9.25 (23.49) | .504 | 9.75 (24.77) | 1.059 (12.69) | 19.35 (49.15) | 1½" (3.81) |
| 2P | 300 | 15.00 (38.1) | .575 | 9.125 (23.18) | .608 (1.54) | 15.86 (40.28) | 1½" (3.81) |
| 2I | 300 | 10.770 (27.35) | .498 | 9.437 (23.96) | .894 (2.27) | 19.13 (48.59) | 1½" (3.81) |
| 3P | 300[4] | 15.00 (38.1) | .600 | 9.750 (24.77) | .650 (1.65) | 16.25 (41.28) | 1½" (3.81) |
| 3I | 300[4] | 11.50 (29.21) | .483 | 9.025 (22.92) | .836 (2.19) | 19.92 (50.60) | 1½" (3.81) |
| 4P | 300 | 14.875 (37.78) | .583 | 8.125 (20.64) | .546 (1.39) | 13.93 (35.38) | 1½" (3.81) |
| 4I | 300 | 11.625 (29.52) | .437 | 8.812 (22.38) | .757 (1.92) | 20.179 (51.25) | 1½" (3.81) |
| 5P | 300 | 15.375 (39.05) | .516 | 15.5 (39.37) | 1.008 (2.56) | 30.03 (76.28) | ½" (1.27) |
| 5I | 300 | 11.750 (29.85) | .453 | 16.6 (43.16) | 1.418 (3.60) | 36.55 (92.84) | ½" (1.27) |
| 6P | 300 | 14.75 (37.47) | .550 | 11.75 (29.85) | .796 (2.02) | 21.36 (54.25) | 1" (2.54) |
| 6I | 300 | 15.03 (38.18) | .637 | 18.937 (48.1) | 1.0625 (2.70) | 25.67 (65.20) | 1" (2.54) |
| 7P | 300 | 14.375 (36.51) | .508 | 11.31 (28.73) | .787 (2.00) | 22.28 (56.59) | 1" (2.54) |
| 7I | 300 | 14.479 (36.78) | .563 | 14.13 (35.89) | .978 (2.48) | 25.08 (63.70) | 1" (2.54) |

NOTE:
[1]P = Prior Art Electrode I = Inventive Electrode
[2]All Samples Cut Were Mild Steel.
[3](—) centimeters
[4]Power only used for striking arc after which power was turned off.

From the foregoing Table it is apparent that ectrodes according to the present invention and in particular to FIGS. 1 and 2 resulted in significantly better performance than those of the prior art. In the category of Cut Per Inch of Electrode Consumed the inventive electrodes were unanimously better than those of the prior art. All tests except for number 3 were run with electrical current being fed to the electrode during the entire test. In the case of test number 3 after cutting began on the test sample the power was turned off and cutting If the outer coating of the electrode is formulated with a red dye (Michigan Chrome and Chemical Company -MICRON 455-Red Vinyl) so the coating is red throughout its cross-sectional thickness, as the electrode is consumed a cone of coating is formed that projects beyond the consumed metallic portions of the electrode. The heat of the arc between the workpiece and the electrode causes the projecting coating to transmit a red glow thus facilitating positioning of the electrode by the diver/welder. The glowing tip aids the diver/welder (user) in maintaining the proper arc length between the workpiece and the electrode.

As with the electrode of FIGS. 1 and 2 the ferrule 26 project beyond one end of the wire 24 and wire 24 projects beyond one end of inner tube 22 thus defining the torch end of the electrode.

Figure 5:
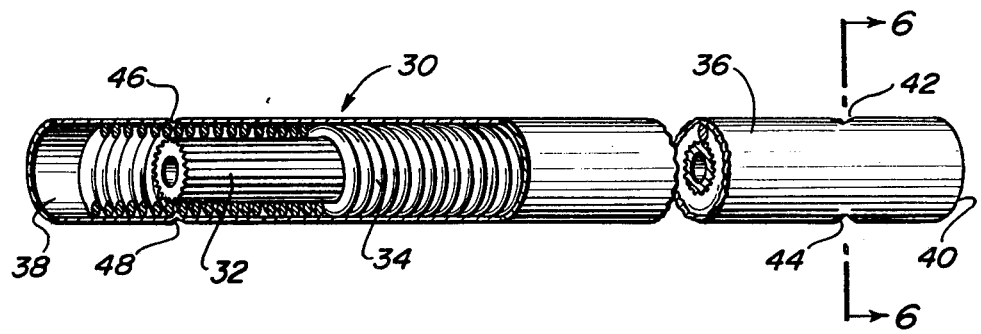
FIG. 5 is a perspective partially sectioned view of an electrode such as shown in FIG. 1 illustrating the present invention which features an inner tube the outer surface of which is provided with a series of parallel grooves to provide a means for facilitating flow of oxidizing gas between the outer surface of the inner tube and the inner surface of the helically wound wire mass.

FIG. 5 shows another embodiment of the electrodes of FIGS. 1 and 3 wherein the electrode 30 encircles a grooved central or inner tube 32. Wrapped around inner tube 32 in a helical fashion is a continuous length of low carbon steel wire 34. Wire 34 is wound to project over the ends of inner tube 32. Disposed around wire 34 and of like dimensions (FIG. 1) is an outer tube 36. As shown in the drawing on the torch end 38 of electrode 30 the outer tube 36 projects beyond wire 34 and wire 34 beyond inner tube 32. On the burning end 40 the three components can be flush. The three components are held in place by a series of random indentations 42, 44, 46, 48 made in outer tube 36. The use of random indentations on the outer tube permits oxidizing gas to flow easily between the outer tube 36 and the outer surface of helically would wire 3 thus assuring an adequate flow of oxidizing gas is present at the burning end 40 of electrode 30. A particularly effective arrangement results from having four randomly spaced indentations near the torch end 38 of the eleotrode 30 and two randomly spaced indentations at the burning end 40 of electrode 30. Dimensionally electrode 30 can be the same as electrode 10.

The ferrule 26 of the electrode 20 of FIG. 3 can also be held in place by random indentations such as used with the electrode of FIG. 5.

Figure 6:
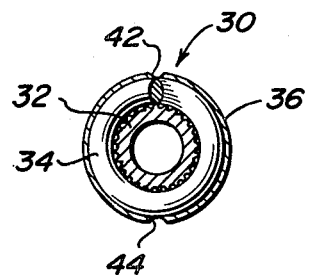
FIG. 6 is a view taken along the line 6—6 of FIG. 5.

FIG. 6 is a cross-sectional view of the electrode of FIG. 5 wherein the outer surface of inner tube 32 is provided with a series of parallel grooves to provide means for facilitating flow of oxidizing gas between the outer surface of tube 32 and the inner surface of helically wound wire 34.

Figure 7:
FIG. 7 is a fragmented elevational view of an alternate form of wire to be used in the electrode of FIGS. 1, 3 and 5.

FIG. 7 shows a wire 50 which has a plurality of random surface dents disposed around its circumference. Thus, for example, when wire 50 is used in the electrode of FIG. 1 the surface dents 52 help oxidizing gas to be conducted between the inner surface of outer tube 16 and the wire helix and between the outer surface of inner tube 12 and the wire helix 50 to assure adequate oxidizing gas at the burning end of the electrode.

Figure 8:
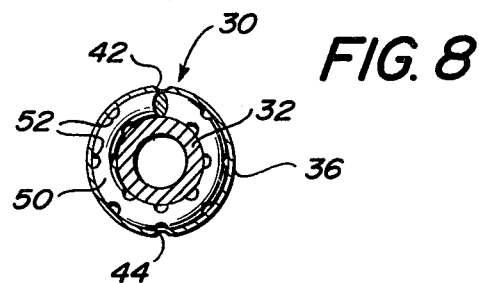
FIG. 8 is a cross-sectional view of an electrode employing the wire of FIG. 7.

FIG. 8 shows a cross-section of another electrode similar to FIG. 5 using the wire 50 of FIG. 7 to form the internal helix. This produces passages 52 for flow of oxidizing gas down through the electrode without the need for longitudinal surface grooves on inner tube 32.

As stated above, the electrodes according to the present invention can be provided with a continuous electrically insulating water impervious cover so that they can be used either above or below the surface of a body of water. In particular, the electrodes have been found to be very effective for under water use.

Using a construction according to the present invention assures that the steel components at the projecting end of the electrode (end opposite that clamped in the torch) are bathed in a stream of high-pressure oxygen. As the electrode is consumed, this intimate relationship between the mass of metal and the oxygen stream must remain for consistent performance. This is assured in the electrodes of the present invention by utilization of the inner tube which is heretofore not shown in the electrode constructions delineated in the prior art.

As described above, each electrode is constructed so that the outer tube or ferrules project over one end of the mass of metal (e.g. spring wound wire) which in turn projects over the inner tube. This construction defines a torch end of the electrode that acts as a manifold so that the oxidizing gas flows mainly through the inner tube. Oxidizing gas is also directed through passages between the inner wall of the outer covering (tube or vinyl) and the mass of metal and between the outer surface of the inner tube and the adjacent surface of the mass of metal.

In some cases it may be advantageous to provide a like recess on the burning end of the electrode to: provide space for oxygen coming through the center tube to diffuse laterally into an annular ring which facilitates ignition of the end of the electrode.

In the case of the embodiment of FIGS. 1, 2, 3, 4, and 5 both the tube and the helical wrap around the inner tube may be recessed from the projecting end of the electrode in order that all parts of the electrode are bathed in oxygen making it easy to initiate the flame and maintain consistent performance of the electrode as it is consumed.

STATEMENT OF INDUSTRIAL APPLICATION

Electrodes according to the present invention can be used on dry land but find excellent utility for under water use. As is well known in the trade, divers performing under water cutting operations are paid premium wages and must have reliable electrodes. They must also have electrodes which will cut efficiently per unit of electrode consumed. Such electrodes are disclosed in the foregoing specification which have been shown to out perform current state of the art electrodes of the multiple wire type.

Having thus described our invention what is claimed and desired to be secured by Letters Patent of the United States is set forth in the accompanying claims.

1. In an exothermic cutting electrode of the type comprising an inner tube around which is wrapped a continuous length of wire in a helical fashion covered by an outer tube, the improvement comprising a plurality of random indentations disposed around and in said outer tube to position said inner tube, coiled wire and outer tube in fixed position one to the other.

2. An electrode according to claim 1 wherein the coiled wire is provided with a series of random surface dents to facilitate passage of oxidizable gas between the inner surface of the coiled wire and the outer surface of the inner tube and the outer surface of the coiled wire and the inner surface of the outer tube.

3. An electrode according to claim 1 wherein the outer surface of the inner tube is provided with a series of longitudinal grooves to facilitate flow of oxidizing gas between the outer surface of the inner tube and the inner surface of the coiled wire.

4. An electrode according to claim 1 wherein the outer tube is substantially covered with a uniform coating of an electrically insulating material which has a red pigment throughout, whereby when said electrode is used underwater oxidation of the metal and cratering of the coating result in a visible end glow of the electrode as it is consumed.

5. An exothermic cutting electrode comprising in combination:

a fluid oxidant passage tube of electrode length, said tube of an oxidizable metal;

a mass of a similar metal disposed around said fluid oxidant passage tube in the form of a continuous wire helically wound around said tube;

an outer tube of an oxidizable material disposed over said fluid oxidant passage tube and said mass of metal;

a plurality of randomly spaced indentations in the surface of said outer tube to hold said mass of metal, said fluid oxidant passage tube and said outer tube in intimate contact with each other; and an electrically insulating water impervious coating of a vinyl having a red dye dispersed throughout over the electrode, said cover easily removable from the ends of said electrode to facilitate initiation of oxidation of said tube end and metal mass.

* * * * *